US009134432B2

United States Patent
Iwashita et al.

(10) Patent No.: US 9,134,432 B2
(45) Date of Patent: Sep. 15, 2015

(54) RADIATION IMAGING APPARATUS, METHOD FOR CONTROLLING THE SAME, AND NON-TRANSITORY COMPUTER-READABLE STORAGE MEDIUM

(71) Applicant: CANON KABUSHIKI KAISHA, Tokyo (JP)

(72) Inventors: Atsushi Iwashita, Honjo (JP); Toshio Kameshima, Kumagaya (JP); Tomoyuki Yagi, Honjo (JP); Katsuro Takenaka, Honjo (JP); Sho Sato, Saitama (JP); Eriko Sugawara, Honjo (JP); Hideyuki Okada, Honjo (JP)

(73) Assignee: Canon Kabushiki Kaisha, Tokyo (JP)

( * ) Notice: Subject to any disclaimer, the term of this patent is extended or adjusted under 35 U.S.C. 154(b) by 104 days.

(21) Appl. No.: 13/971,973

(22) Filed: Aug. 21, 2013

(65) Prior Publication Data

US 2014/0061491 A1 Mar. 6, 2014

(30) Foreign Application Priority Data

Aug. 31, 2012 (JP) ................................. 2012-192291

(51) Int. Cl.
*G01J 1/42* (2006.01)
*G01T 1/16* (2006.01)
*H04N 5/32* (2006.01)
*H04N 5/361* (2011.01)
*H04N 5/357* (2011.01)
*H04N 5/374* (2011.01)

(52) U.S. Cl.
CPC .. *G01T 1/16* (2013.01); *H04N 5/32* (2013.01); *H04N 5/3575* (2013.01); *H04N 5/361* (2013.01); *H04N 5/3742* (2013.01)

(58) Field of Classification Search
CPC .......... H04N 5/32; H04N 5/361; H04N 5/357
USPC ........................................................ 250/393
See application file for complete search history.

(56) References Cited

U.S. PATENT DOCUMENTS 7,514,690 B2   4/2009  Endo et al. ............... 250/370.08
7,718,973 B2   5/2010  Endo et al. ............... 250/370.08
8,107,588 B2   1/2012  Kameshima et al. ........... 378/62

(Continued)

FOREIGN PATENT DOCUMENTS

JP       2002-181942        6/2002
WO    WO 2012/032801 A    3/2012

OTHER PUBLICATIONS

EESR issued Nov. 28, 2013 in counterpart EPC patent application 13181369.3-1902.

*Primary Examiner* — David J Makiya
*Assistant Examiner* — Kenneth J Malkowski
(74) *Attorney, Agent, or Firm* — Fitzpatrick, Cella, Harper & Scinto

(57) ABSTRACT

A radiation imaging apparatus, comprising a sensor array in which a plurality of sensors configured to output signals corresponding to irradiated radiation, a detection unit configured to detect radiation, a driving unit configured to drive the sensor array, so as to initialize the plurality of sensors for each row repeatedly at least until the detection unit detects irradiation of radiation and to read out signals from the plurality of sensors for each row sequentially, and a processing unit configured to process signals from the sensor array, so as to correct a signal from the sensor on a row, of the plurality of sensors, which has been initialized during the irradiation of radiation, based on a timing of the initialization.

8 Claims, 9 Drawing Sheets

(56) References Cited

U.S. PATENT DOCUMENTS

| | | | |
|---|---|---|---|
| 2007/0125952 A1 | 6/2007 | Endo | 250/369 |
| 2008/0246065 A1* | 10/2008 | Takenaka et al. | 257/292 |
| 2011/0309262 A1 | 12/2011 | Sato et al. | 250/393 |
| 2011/0317054 A1 | 12/2011 | Kameshima et al. | 348/302 |
| 2013/0161526 A1 | 6/2013 | Tajima | 250/394 |
| 2013/0240712 A1 | 9/2013 | Takenaka et al. | 250/208.1 |
| 2014/0112448 A1 | 4/2014 | Takenaka et al. | 250/370.09 |

* cited by examiner

F I G. 6
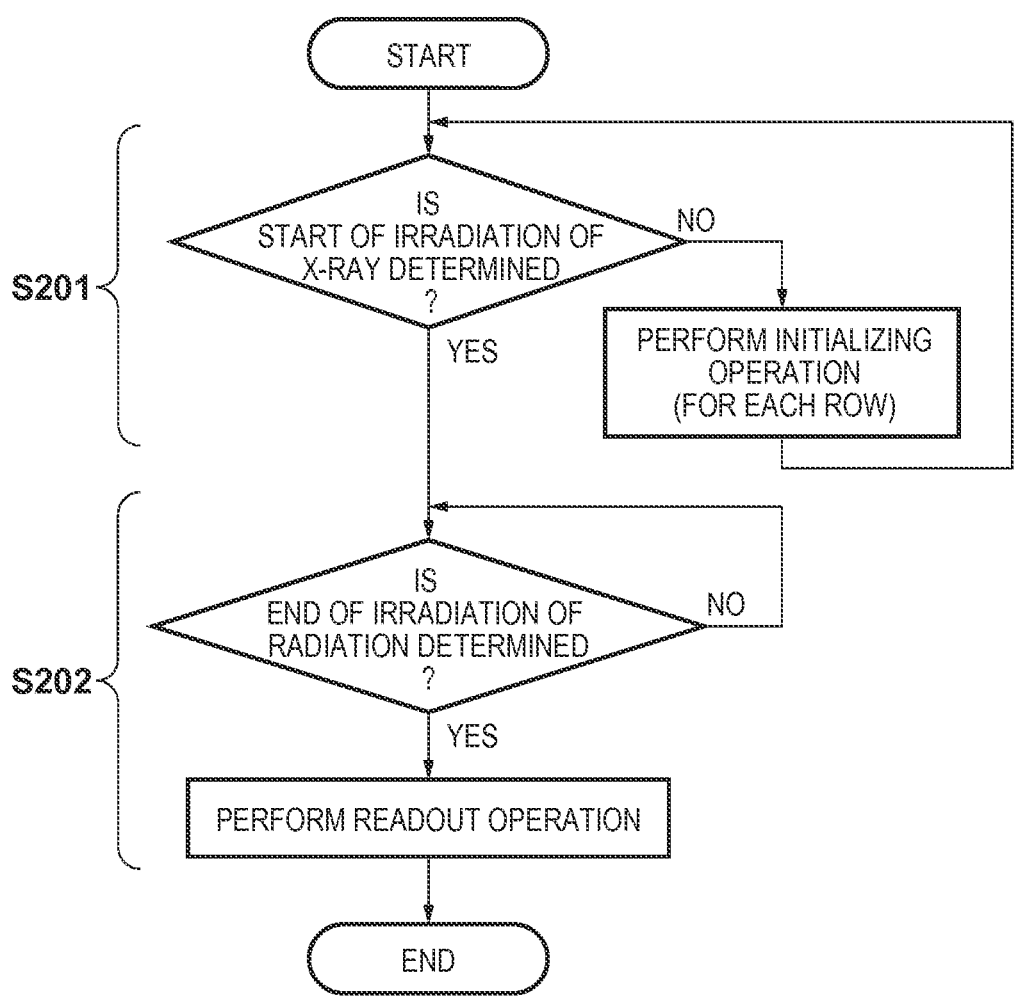

RADIATION IMAGING APPARATUS, METHOD FOR CONTROLLING THE SAME, AND NON-TRANSITORY COMPUTER-READABLE STORAGE MEDIUM

BACKGROUND OF THE INVENTION

1. Field of the Invention

The present invention relates to a radiation imaging apparatus, a method for controlling the radiation imaging apparatus, and a non-transitory computer-readable storage medium.

2. Description of the Related Art

A radiation imaging apparatus performs an initializing operation that comprises periodically initializing each sensor of a sensor array and a readout operation that comprises reading out signals corresponding to the charges accumulated upon irradiation of radiation after the initializing operation. The apparatus performs the initializing operation to initialize charges due to the dark currents generated in the sensor array. If, however, radiation is irradiated during the initializing operation, signal components are lost by the initializing operation during this period.

According to Japanese Patent Laid-Open No. 2002-181942, it is possible to perform correction by using the signals stored by the initializing operation even if the signal output from each sensor by the initializing operation is temporarily stored in a frame memory and radiation is irradiated in the middle of initializing operation.

According to the method disclosed in Japanese Patent Laid-Open No. 2002-181942, in the initializing operation repeatedly performed until the start of readout operation, the signals obtained by signal reading operation are stored in a frame memory. It is therefore necessary to maintain a readout circuit for reading out signals and a processing unit for processing the signals in an active state. This leads to the consumption of power by the initializing operation even before the start of the radiation imaging. This makes it difficult to use a portable cassette-type radiation imaging apparatus for a long period of time.

SUMMARY OF THE INVENTION

The present invention provides a technique advantageous in improving the quality of a radiation image by properly performing radiation imaging.

One of the aspects of the present invention provides a radiation imaging apparatus comprising a sensor array in which a plurality of sensors configured to output signals corresponding to irradiated radiation are arranged to form a plurality of rows and a plurality of columns, a driving unit configured to drive the sensor array, a detection unit configured to detect radiation, and a processing unit configured to process signals from the sensor array, wherein the driving unit is configured to drive the sensor array, so as to initialize the plurality of sensors for each row repeatedly at least until the detection unit detects irradiation of radiation and to read out, from the plurality of sensors for each row sequentially, signals each of which corresponds to an amount of charges accumulated after final initialization of the corresponding sensor, and the processing unit is configured to correct a signal from the sensor on a row, of the plurality of sensors, which has been initialized during irradiation of radiation, so as to compensate for a degradation in the signal due to the initialization performed after the irradiation, based on a timing of the initialization.

Further features of the present invention will become apparent from the following description of exemplary embodiments with reference to the attached drawings.

BRIEF DESCRIPTION OF THE DRAWINGS

FIG. 6 is a flowchart in the third embodiment;

DESCRIPTION OF THE EMBODIMENTS

First Embodiment

Figure 1:
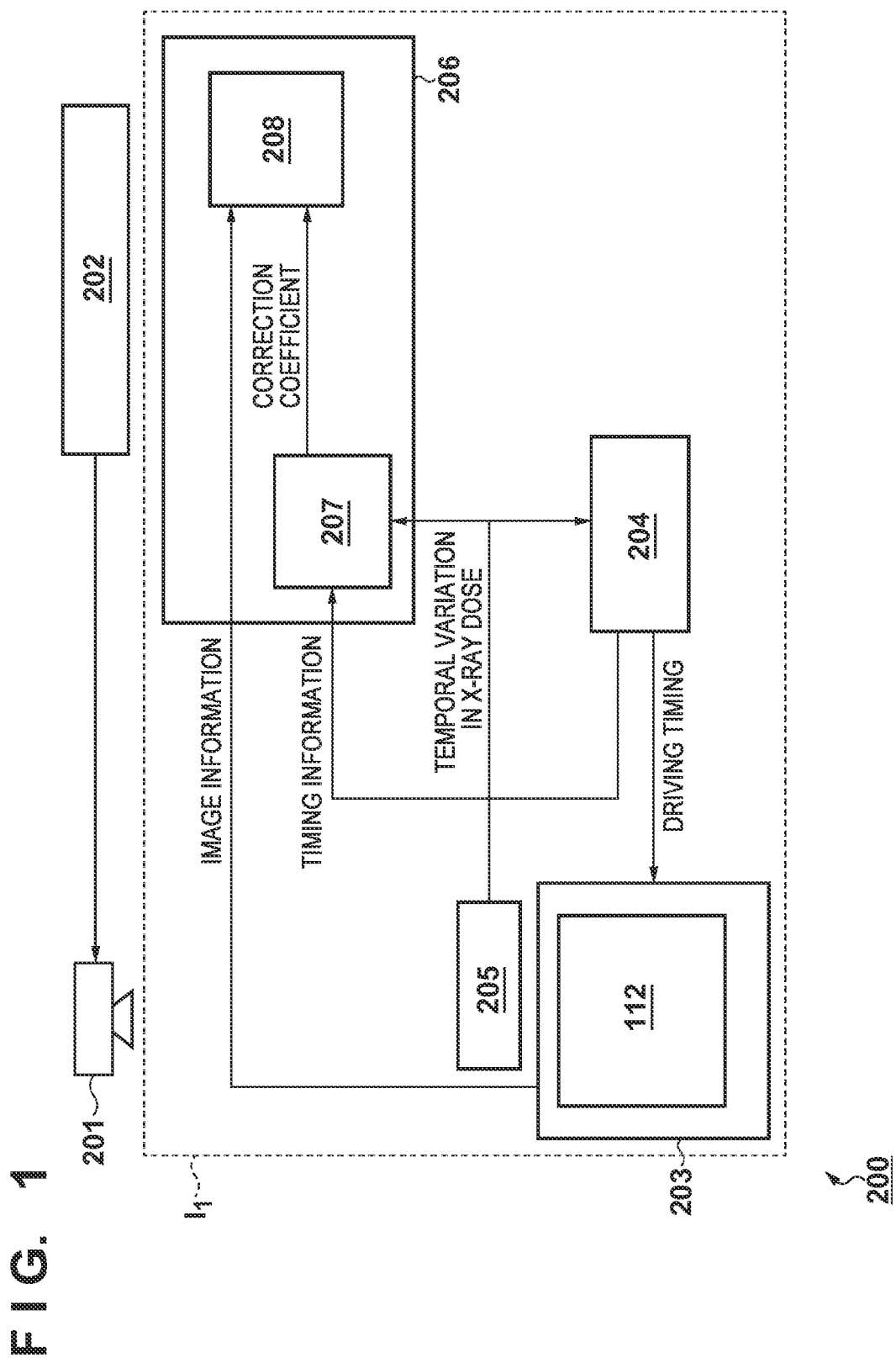
FIG. 1 is a block diagram for explaining an example of the arrangement of a radiation imaging system according to the first embodiment.

A radiation imaging apparatus $I_1$ according to the first embodiment will be described with reference to FIGS. 1 to 4. FIG. 1 shows a radiation imaging system 200 including the radiation imaging apparatus $I_1$. The radiation imaging system 200 includes a radiation source 201, a radiation controller 202, and the radiation imaging apparatus $I_1$. The radiation source 201 generates radiation in response to an instruction from the radiation controller 202. Radiation includes particle rays and electromagnetic waves such as X-ray, α-rays, β-rays, γ-rays, and cosmic rays. The radiation imaging apparatus $I_1$ includes a sensor panel 203 including a sensor array 112, a driving unit 204 for driving the sensor array 112, a detection unit 205 for detecting radiation, and a processing unit 206 for processing a signal from the sensor array 112. The sensor array 112 is configured such that, for example, a plurality of sensors (or pixels) form a plurality of rows and a plurality of columns, and outputs a signal corresponding to irradiated radiation. The processing unit 206 can include a correction unit 207 for correcting the signal acquired from the sensor array 112 and a calculation unit 208 for calculating a correction coefficient used for the correction.

The radiation generated from the radiation source 201 enters the sensor array 112 through the body of a subject (not shown) to be examined. In response to the detection of radiation by the detection unit 205, a signal corresponding to the incident radiation is read out from the sensor array 112, and the processing unit 206 performs predetermined processing for the signal, thereby obtaining a radiation image of the inside of the body of the subject. The obtained radiation image is output to a display unit (not shown) such as a display monitor or the like.

The detection unit 205 can be formed from a sensor using a phosphor which converts radiation into light and a photoelectric conversion element such as a PIN (P-type semiconductor, Intrinsic semiconductor, and N-type semiconductor) sensor or MIS (Metal Insulator Semiconductor) sensor. It is possible to measure the intensity of radiation based on a signal level from the sensor. This makes the detection unit 205 detect the irradiated radiation. The driving unit 204 drives the sensor array 112 in accordance with both the detection result obtained by the detection unit 205 and a signal from the processing unit 206. The driving unit 204 also outputs driving information such as the time (timing) at which the sensor array 112 is driven and the like to the calculation unit 208. The calculation unit 208 calculates a correction coefficient in the following manner by using this driving information and the detection result obtained by the detection unit 205. The correction unit 207 corrects a signal from the sensor array 112 by using this correction coefficient. Although the above description has exemplified the arrangement in which the processing unit 206 is included in the radiation imaging apparatus $I_1$, the present invention is not limited to this as long as the above system is formed. For example, the processing unit 206 may belong to an apparatus which is simultaneously (or collaterally) used with the radiation imaging apparatus $I_1$.

Figure 2:
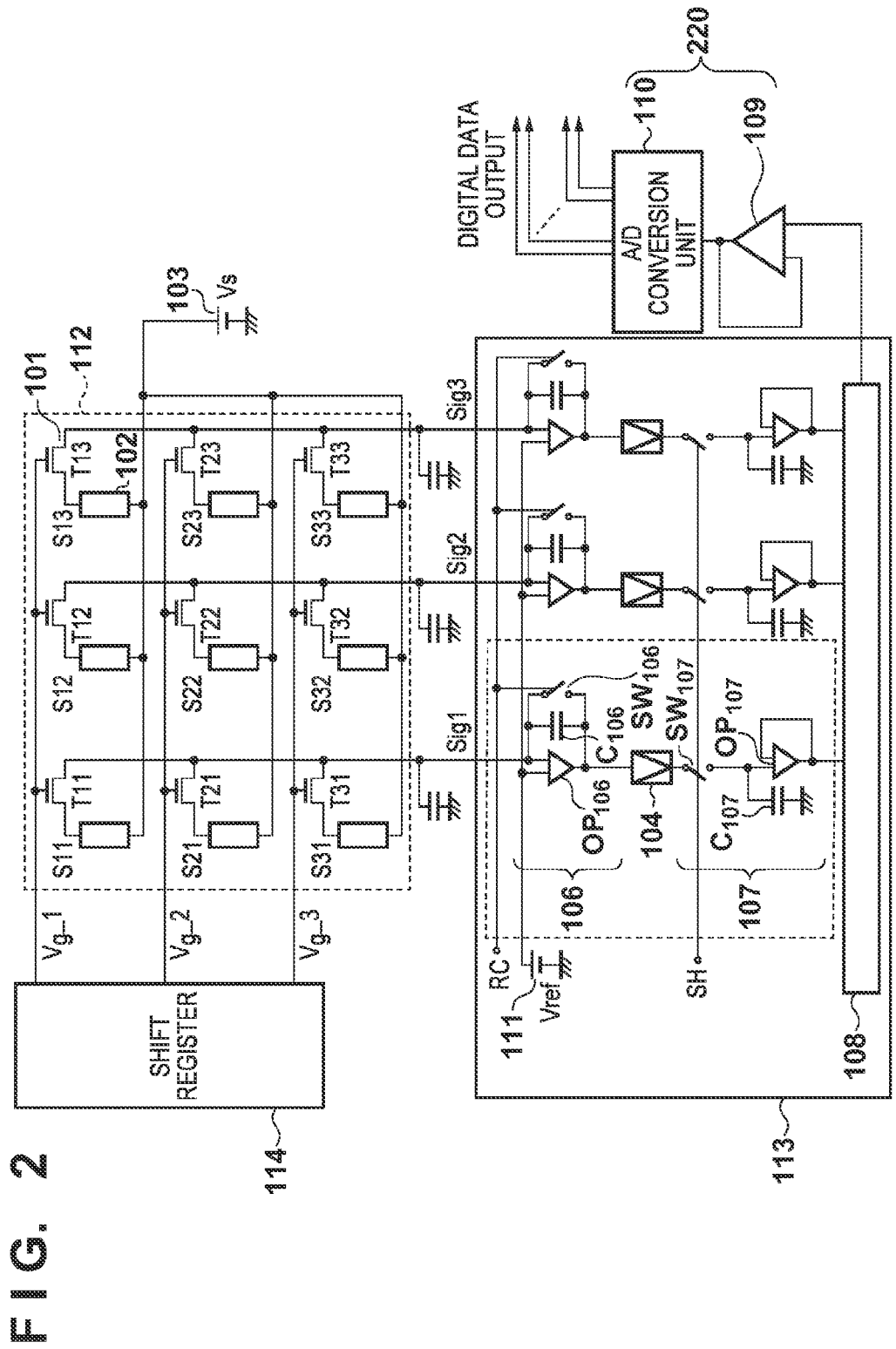
FIG. 2 is a circuit diagram for explaining an example of the circuit arrangement of a sensor array and its peripheral circuits.

FIG. 2 shows an example of the circuit arrangement of the sensor array 112 and its peripheral circuits. The sensor panel 203 (shown in FIG. 1) includes the sensor array 112, a shift register 114, a readout circuit 113, and a signal output unit 220. For the sake of simplicity, the sensor array 112 in this case is constituted by 3 row×3 column sensors S (S11 to S33) as a conversion element 101. For example, when using a 17-inch apparatus, the sensor array 112 can include about 2800 row×2800 column sensors. The shift register 114 supplies control signals Vg, that is, Vg_1 to Vg_3 to the sensor array 112 in accordance with signals from the driving unit 204 (for example, shift clock signals for the shift register 114, the pulses transferred by the shift register 114, and signals for controlling the outputs of the shift register 114). In accordance with the control signals Vg, the sensor array 112 outputs signals Sig, that is, Sig1 to Sig3 from the sensors S on the respective rows. The readout circuit 113 includes amplification circuits 106, gain amplifiers 104, and sample/hold circuits 107 which are arranged in correspondence with the respective columns, and a transfer unit 108 for the horizontal transfer of signals from the respective columns to the signal output unit 220. With this arrangement, the signals Sig from the sensor array 112, which are read out for the respective rows, are sequentially output to the signal output unit 220 for the respective columns. The signal output unit 220 can include an amplifier 109 which amplifies signals and an A/D conversion unit 110 which performs A/D (Analog/Digital) conversion. The signal output unit 220 can thus convert a readout signal into a digital signal and output it to the processing unit 206.

The sensor array 112 is configured such that the plurality of sensors S are arranged to form a plurality of rows and a plurality of columns, and the sensor array 12 outputs signals corresponding to irradiated radiation. Each sensor S can be constituted by, for example, a sensor using a phosphor which converts radiation into light and a photoelectric conversion element such as a PIN sensor or MIS sensor. For example, the sensor S to be used is obtained by forming a MIS photodiode using amorphous silicon on an insulating substrate such as a glass substrate. Note that each sensor S receives a reference voltage Vs (reference potential) from a power supply 103. The sensor S generates and accumulates charge with the lapse of time. Subsequently, a thin-film transistor T as a switching element 102, that is, each of T11 to T33, is turned on in response to a respective control signal Vg. Each transistor T outputs the signal Sig corresponding to the amount of charge accumulated in the sensor S to the readout circuit 113. In the readout circuit 113, the amplification circuit 106 and the gain amplifier 104 amplify the signal Sig. The amplification circuit 106 can be constituted by, for example, an operational amplifier $OP_{106}$, a feedback capacitor $C_{106}$, and a reset switch $SW_{106}$. The inverting input terminal and non-inverting input terminal of the operational amplifier $OP_{106}$ respectively receive the signal Sig and a reference voltage Vref. A power supply 111 supplies the reference voltage Vref to the non-inverting input terminal. The feedback capacitor $C_{106}$ and the reset switch $SW_{106}$ are arranged in parallel with each other between the inverting input terminal and the non-inverting input terminal. Changing the capacitance value of the feedback capacitor $C_{106}$ can change the amplification factor of the amplification circuit 106. Reset control signal RC applied to the reset switch $SW_{106}$ is configured to control a timing of resetting the feedback capacitor $C_{106}$. The sample/hold circuit 107 is constituted by, for example, a sampling switch $SW_{107}$, a sampling capacitor $C_{107}$, and an operational amplifier $OP_{107}$, and performs predetermined sampling on readout signals by a sampling and holding signal SH. Subsequently, the transfer unit 108 performs horizontal transfer of these signals to the signal output unit 220. The A/D conversion unit 110 A/D-converts the signals. In this manner, signals are read out from the sensor array 112 and output to the processing unit 206.

Figure 3:
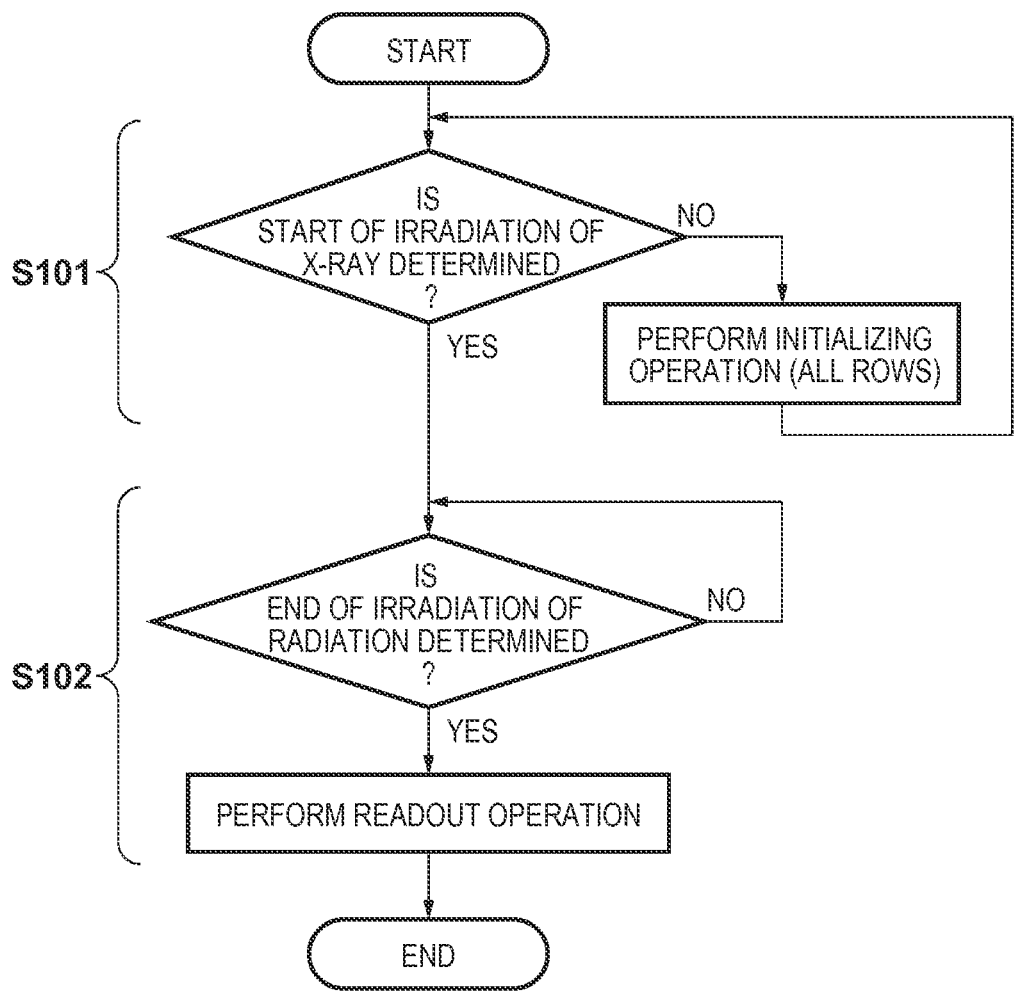
FIG. 3 is a flowchart in the first embodiment.

FIG. 3 is a flowchart for radiation imaging. In step S101 (to be simply referred to as "S101"; the same applies to the remaining steps), the driving unit 204 sequentially and repeatedly performs initialization (initializing operation) of the sensors S until the detection unit 205 detects the irradiation of radiation. The driving unit 204 performs this initializing operation to initialize the charges accumulated in the sensors S due to the dark currents generated in them. It is possible to reduce the power consumption by, for example, setting the readout circuit 113 in a pause state during the execution of initializing operation. The driving unit 204 repeats initializing operation until the process advances to S102, thereby periodically initializing the sensors S. In response to the detection of the completion of irradiation by the detection unit 205, the apparatus sequentially reads out signals from the sensor array 112 for each row of the sensor array 112 (readout operation) in S102. The signal read out from each sensor S by readout operation corresponds to the amount of charge accumulated in the sensor S after the last initialization in the sensor S.

Figure 4:
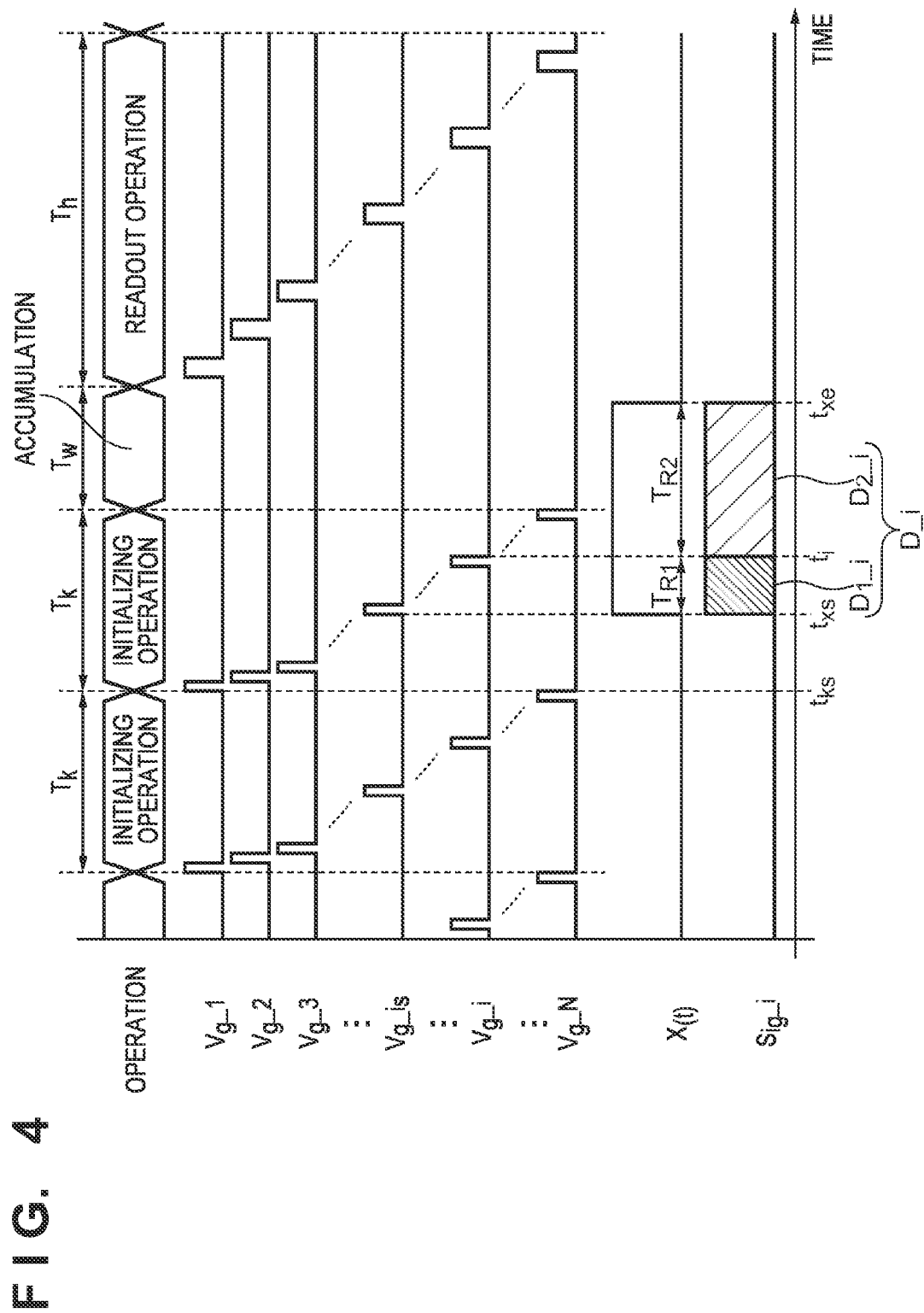
FIG. 4 is a timing chart in the first embodiment.

FIG. 4 is a timing chart for radiation imaging. With the abscissa representing the time, this timing chart shows the wave forms of the control signals Vg input to the sensor array 112 and a radiation intensity X(t). Let N be the number of rows of the sensor array 112, and Vg_1, Vg_2, ..., Vg_N be the control signals Vg corresponding to the respective rows with respect to an arbitrary column. This chart shows a signal Sig_i from the sensor S on the ith row below the wave form of the radiation intensity X(t).

As described above, the apparatus repeatedly performs the initializing operation until the start of the irradiation. A term corresponding to one cycle of initializing operation is defined as a term $T_k$. After the detection unit 205 detects the start of the irradiation, the apparatus can start the initializing operation after, for example, the lapse of a predetermined time $T_w$ since the completion of the initialization of the sensor S on the last row. $T_w$ may be set to be the time suitable for the accumulation of charge corresponding to the radiation irradiated on each sensor S. The term required for readout operation is defined as a term $T_h$. The width of each pulse may be set in consideration of, for example, the time constant of the capacitance of the sensor S and the thin-film transistor T.

The following will describe a procedure for correction in this embodiment, with focus being placed on, for example, the signal Sig_i from the sensor S on the $i^{th}$ row of the sensors S initialized after the start of the irradiation. This embodiment will exemplify a case in which the wave form of the intensity of radiation is rectangular. Assume that the sensor S on the $i_s^{th}$ row is the sensor S, of the sensors S initialized after the start of the irradiation, which is located on the first row. That is, i is one of natural numbers $i_s$ to N. The time when the sensors on the $i^{th}$ row are initialized is defined as time $t_i$. The time when the irradiation starts is defined as time $t_{xs}$, and the time when the irradiation ends is defined as time $t_{xe}$. The start time of initializing operation which has been performed at the start of the irradiation is defined as time $t_{ks}$.

The sensor S on the ith row has been initialized at time ti. For this reason, the initialization eliminates a signal component $D_1\_i$, of a signal D_i to be obtained in correspondence with the irradiation, which corresponds to the period (first term $T_{R1}$) from the end of the irradiation to the initialization. Therefore, the readout operation performed thereafter obtains a signal component $D_2\_i$ corresponding to the period (second term $T_{R2}$) from the end of the initialization to the end of the irradiation.

Losing the signal component $D_1\_i$ by initialization can cause artifacts in the radiation image formed thereafter. The processing unit 206 therefore corrects a signal from the sensor S on a row which has been initialized during the irradiation of radiation so as to compensate for degradation in the signal due to the initialization. In this case, the relationship of $D_1\_i:D_2\_i=T_{R1}:T_{R2}=(ti-t_{xs}):(t_{xe}-ti)$ holds between $D_1\_i$ and $D_2\_i$, for an arbitrary column, within the range of $i_s \leq i \leq N$.

In addition, for an arbitrary column, a signal D_i' after correction can be expressed as $D\_i'=D_1\_i+D_2\_i=D_2\_i \times Ei$ by using a correction coefficient Ei for the above correction and $D_1\_i$ and $D_2\_i$. In this case, this embodiment calculates the correction coefficient Ei from the ratio between the irradiation time of radiation which has formed the signal component $D_1\_i$ and the irradiation time of radiation which has formed the signal component $D_2\_i$. This correction coefficient Ei can be expressed as $Ei=(t_{xe}-t_{xs})/(t_{xe}-ti)$.

Time $t_i$ can be expressed as $t_i=t_{ks}+T_k \times i/N$ for an arbitrary column in the range of $i_s \leq i \leq N$ by using the term $T_k$ corresponding to one cycle of initializing operation, start time $t_{ks}$ of the last initializing operation, and the number N of rows of the sensor array 112. Therefore, the correction coefficient Ei can be expressed as $Ei=(t_{xe}-t_{xs})/(t_{xe}-t_{ks}-T_k \times i/N)$ for an arbitrary column within the range of $i_s \leq i \leq N$. Irradiation start time $t_{xs}$ and irradiation end time $t_{xe}$ are obtained based on the radiation detection result obtained by the detection unit 205. Pieces of driving information, that is, the term $T_k$ and time $t_{ks}$ are obtained from the driving unit 204. In addition, $i_s$ can be expressed as $i_s=N \times (t_{xs}-t_{ks})/T_k$. Therefore, the apparatus may perform sequence control to make the processing unit 206 correct signals from the sensor array 112 by using the correction coefficient Ei based on outputs from the driving unit 204 and the detection unit 205. In addition, time $t_{xs}$ and time $t_{xe}$ may be obtained from the radiation controller 202.

On the other hand, for the sensors S on the first row to the $(i_s-1)^{th}$ row, since they have not been initialized after the start of the irradiation, $D_2\_i=D\_i$ (that is, $D_1\_i=0$). Therefore, the apparatus may output the signal obtained by the readout operation without any change or may perform the above correction processing by using correction coefficient Ei=1 within the range of $1 \leq i \leq i_s-1$.

In the above manner, the processing unit 206 corrects a signal from the sensor S on a row which has been initialized during the irradiation. The apparatus performs this correction so as to compensate for a degradation in signal due to initialization performed after the irradiation based on the timing of the initialization. This can improve the quality of a radiation image.

Although this embodiment has exemplified the case in which the intensity of radiation has a rectangular wave form, the above sequence control may be performed assuming that the actual wave form is approximate to a rectangular wave form. In this case, for example, the apparatus may use a comparator to acquire time $t_{xs}$ when the radiation dose has become larger than a predetermined threshold and time $t_{xe}$ when the radiation dose has become larger than a predetermined threshold. If driving information is set in advance, the apparatus may perform the above correction by using the information. When multiplying a coefficient corresponding to the environment for imaging, the apparatus may acquire necessary information in accordance with specifications, as needed. In addition, the embodiment has exemplified the indirect type radiation detection method for acquiring an electrical signal by converting radiation into light and then performing photoelectric conversion. However, the apparatus may use a direct type radiation detection method for directly converting radiation into an electrical signal. Although the embodiment has exemplified the arrangement in which the detection unit 205 is installed as an independent unit, the detection unit 205 may be formed by using some sensors of the sensor array 112. Alternatively, it is possible to use, as the detection unit 205, an arrangement configured to monitor a current in a wiring of the sensor array 112, such as a wiring for applying the reference voltage Vs from the power supply 103 to the sensor S.

Second Embodiment

Figure 5:
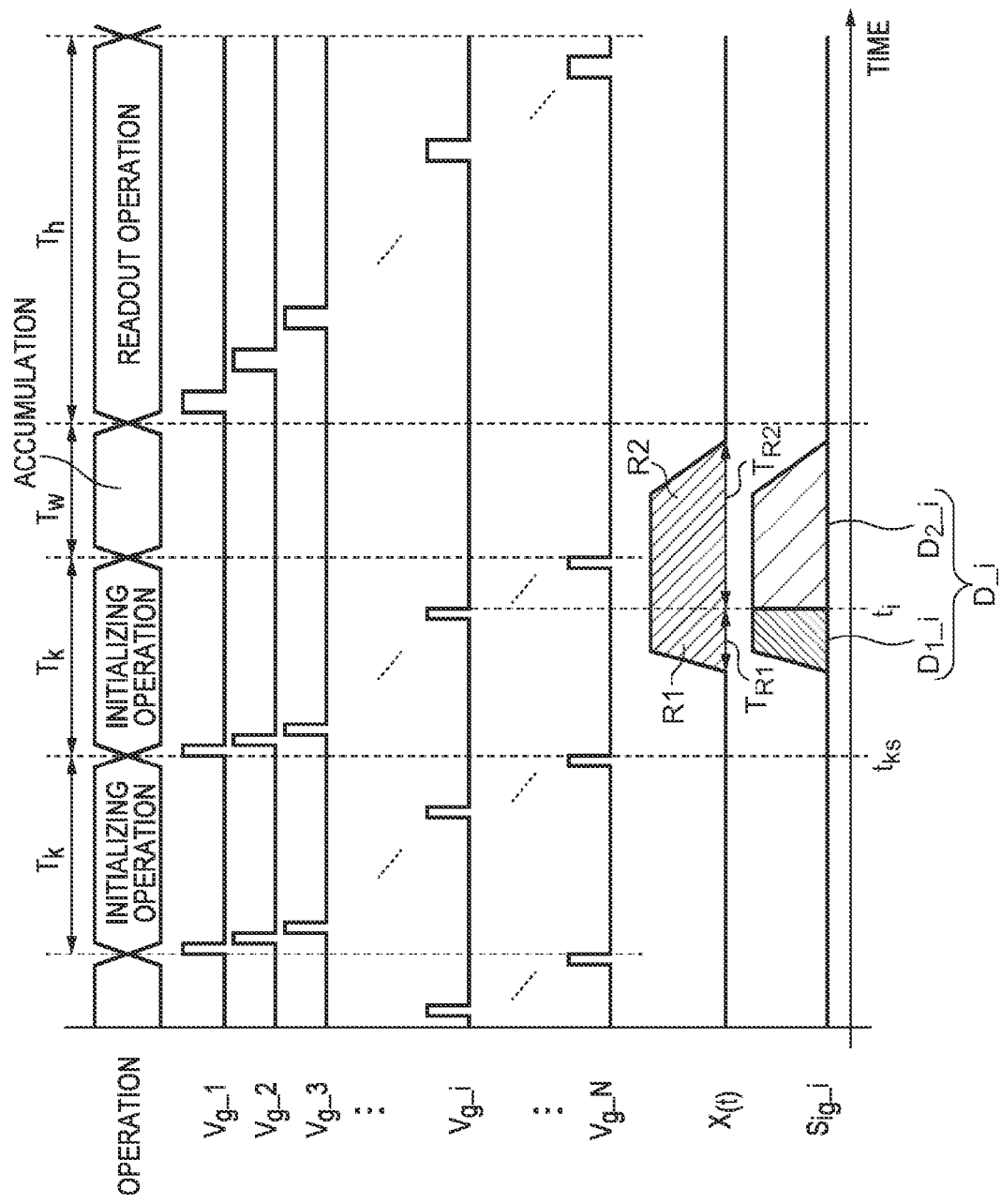
FIG. 5 is a timing chart in the second embodiment.

A radiation imaging apparatus $I_2$ according to the second embodiment will be described with reference to FIG. 5. Like FIG. 4, FIG. 5 is a timing chart for radiation imaging in this embodiment. The embodiment differs from the first embodiment, which performs correction by using start time $t_{xs}$ of the irradiation and end time $t_{xe}$, in that it performs the above correction from the measurement result on the radiation dose. A processing unit 206 calculates the ratio between a first radiation dose R1 measured in a first term $T_{R1}$ and a second radiation dose R2 measured in a second term $T_{R2}$ with respect to a sensor S on the $i^{th}$ row based on the measurement result on a radiation intensity X(t). The first term $T_{R1}$ is the term from the start of the irradiation to the initialization, and the second term $T_{R2}$ is the term from the end of the first term to the end of irradiation. The radiation doses R1 and R2 may be acquired by known calculation processing based on, for example, the output result obtained by the detection unit 205. It is possible to express the relationship between $D_1\_i$ and $D_2\_i$ described above as equation (1) for the sensor S on the $i^{th}$ row at an arbitrary column. As described in the first embodiment, since $D_1\_i'=D_1\_i+D_2\_i=d\_i \times Ei$ and $t_i=t_{ks}+T_k \times i/N$, the correction coefficient Ei can be expressed as equation (2) given below. For an arbitrary row ($1 \leq i \leq N$), the apparatus may perform correction processing for a signal from the sensor array 112 by using the correction coefficient Ei.

$$D_1\_i:D_2\_i = R1:R2 = \int_{t_{ks}}^{t_i} X(t)dt : \int_{t_i}^{t_{ks}+T_k+T_w} X(t)dt \quad (1)$$

$$Ei = \frac{\int_{t_{ks}}^{t_{ks}+T_k+T_w} X(t)dt}{\int_{t_{ks}+T_k+\frac{i}{N}}^{t_{ks}+T_k+T_w} X(t)dt} \quad (2)$$

According to this embodiment, it is possible to correct a signal from the sensor array 112 with respect to the wave form of arbitrary radiation intensity and an arbitrary row. In addition, a radiation dose calculation step may be started and ended on the condition that a radiation intensity X(t) has reached a predetermined reference value. Reference values for the start and end of irradiation may be the same or different from each other or may be changed, as needed, in accordance with an environment for imaging and specifications.

Third Embodiment

A radiation imaging apparatus $I_3$ according to the third embodiment will be described with reference to FIGS. 6 and 7. The third embodiment differs from the second embodiment in that it ends initialization of sensors S of a sensor array 112 in accordance with the timing of the detection of radiation. FIG. 6 is a flowchart for radiation imaging in this embodiment. In S201, the apparatus repeatedly performs the initializing operation described in the first embodiment. The apparatus repeats the initializing operation until the process advances to S202, thereby periodically initializing the sensors S. In the embodiment, the apparatus interrupts initializing operation in accordance with the timing of the detection of the end of the irradiation by a detection unit 205. In S202, the apparatus performs readout operation in the same manner as in S102 in the first embodiment.

Figure 7:
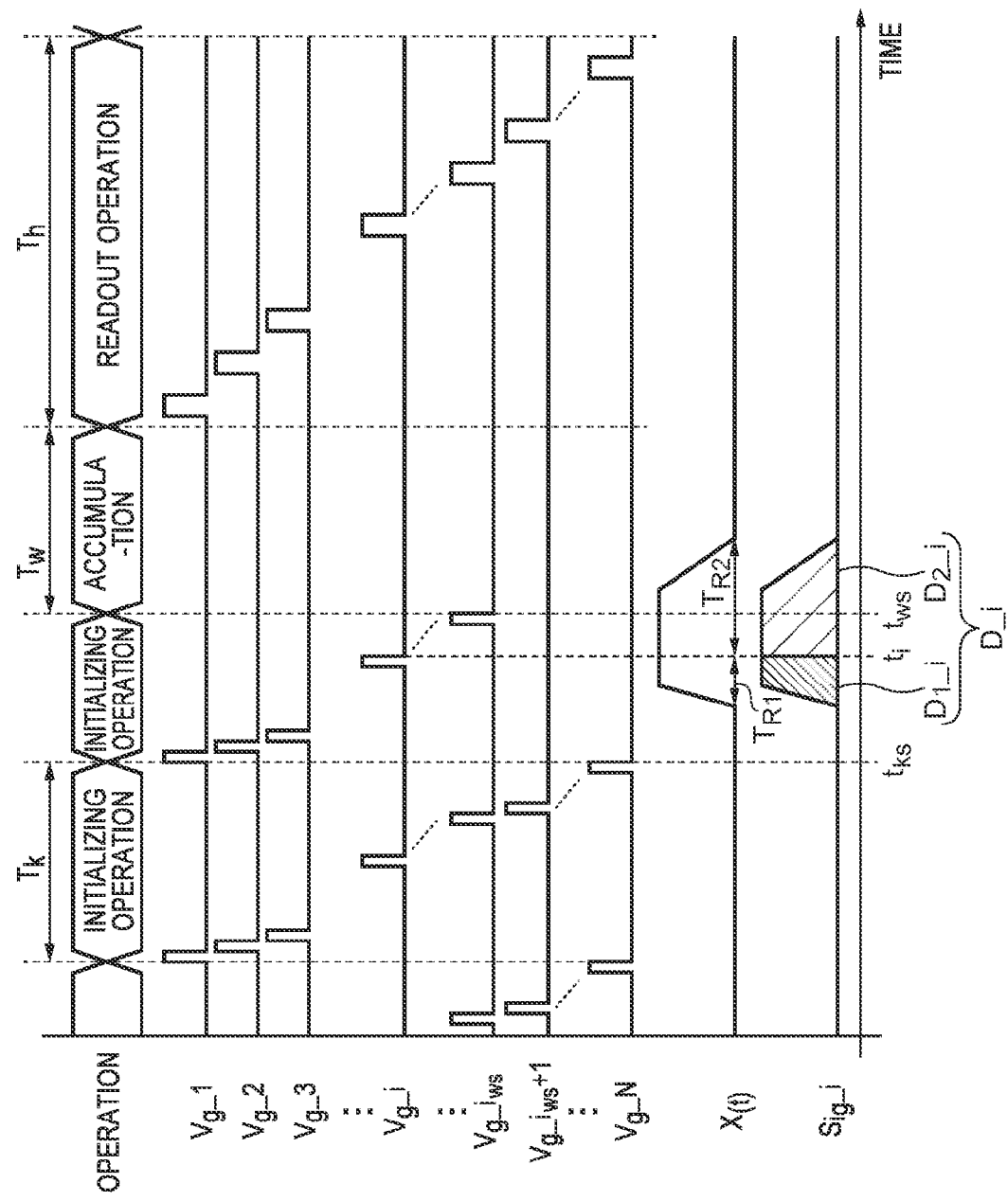
FIG. 7 is a timing chart in the third embodiment.

Like FIG. 4, FIG. 7 is a timing chart for radiation imaging in this embodiment. Consider a case in which the apparatus interrupts initializing operation at the $i_{ws}^{th}$ row after the detection of radiation by the detection unit 205, and ends the initialization of the sensors S. If the time corresponding to this operation is defined as time $t_{ws}$, $t_{ws}=t_{ks}+T_k \times i_{ws}/N$. In this case, the relationship between $D_1\_i$ and $D_2\_i$ with respect to an arbitrary column can be expressed as equation (3) given below within the range of $1 \leq i \leq i_{ws}$. In this case, since $D\_i'=D_1\_i+D_2\_i=D_2\_i \times Ei$ and $t_i=t_{ks}+T_k \times i/N$, a correction coefficient Ei can be expressed as equation (4) given below with respect to an arbitrary column. Therefore, the apparatus may perform correction processing of signals from the sensor array 112 by using the correction coefficient Ei within the range of $1 \leq i \leq i_{ws}$.

$$D_1\_i : D_2\_i = \int_{t_{ks}}^{t_i} X(t)dt : \int_{t_i}^{t_{wsi}+T_w} X(t)dt \quad (3)$$

$$Ei = \frac{\int_{t_i}^{t_{wsi}+T_w} X(t)dt}{\int_{t_{ksi}+T_k+\frac{i}{N}}^{t_{wsi}+T_w} X(t)dt} \quad (4)$$

On the other hand, for the sensors S on the $(i_{ws}+1)^{th}$ row to the $N^{th}$ row, since they have not been initialized after the start of the irradiation, $D_2\_i=D\_i$ (that is, $D_1\_i=0$). The apparatus may therefore output the signals obtained by readout operation without any change, and may perform correction processing described above with correction coefficient Ei=1 within the range of $i_{ws}+1 \leq i \leq N$.

As described above, according to this embodiment, it is possible to correct signals with respect to the wave form of arbitrary radiation intensity and to obtain the same effect as that of the first and second embodiments. The third embodiment is advantageous when, for example, the wave form of a radiation intensity X(t) is not rectangular (for example, the intensity immediately after the start of irradiation is weak and does not reach a reference value) and when a delay has occurred until initializing operation is interrupted after the detection of radiation.

Fourth Embodiment

Figure 8:
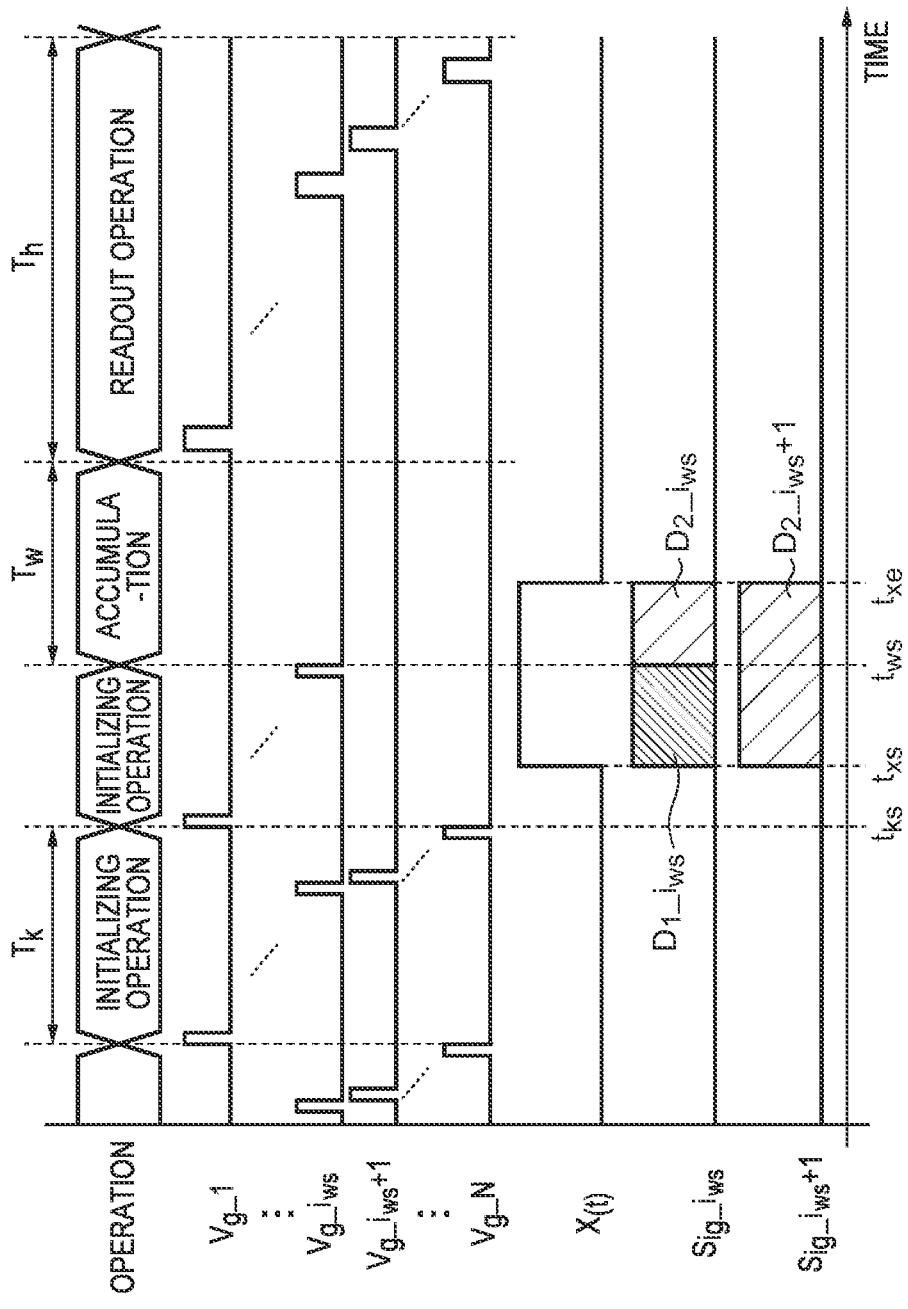
FIG. 8 is a timing chart in the fourth embodiment.

A timing chart for radiation imaging in the fourth embodiment will be described with reference to FIG. 8. In this embodiment, the apparatus interrupts initializing operation in accordance with the timing of the detection of radiation when the wave form of a radiation intensity X(t) exemplified in the first embodiment is rectangular (or can be approximated to a rectangular shape). Consider a case in which the apparatus interrupts initializing operation of sensors S on the $i_{ws}^{th}$ row at time $t_{ws}$ after the detection of radiation by a detection unit 205 as in the third embodiment. In this case, for an arbitrary column, $D_1\_i : D_2\_i = (ti-t_{xs}) : (t_{xe}-ti)$ within the range of $i_s \leq i \leq i_{ws}$. As in the first embodiment, therefore, a correction coefficient Ei can be expressed as $Ei=(t_{xe}-t_{xs})/(t_{xe}-t_{ks}-T_k \times i/N)$ within the range of $i_s \leq i \leq i_{ws}$ for an arbitrary column. In this manner, the apparatus may calculate the correction coefficient Ei by acquiring necessary information from a driving unit 204 or the detection unit 205, and perform the above correction processing. Time $t_{xs}$ and time $t_{xe}$ may be acquired from a radiation controller 202.

With regards to sensors S on the first row to the $(i_s-1)^{th}$ row and sensors S on the $(i_{ws}+1)^{th}$ row to the Nth row, since they have not been initialized after the start of the irradiation, $D\_i=D2\_i$ ($D1\_i=0$). Therefore, the apparatus may output the signals obtained by readout operation without any change or may perform the above correction processing with correction coefficient Ei=1 within the ranges of $1 \leq i \leq i_s-1$ and $i_{ws}+1 \leq i \leq N$.

The present invention is not limited to the four embodiments described above.

Each embodiment described above has exemplified the case in which the charges accumulated due to the dark currents generated in the respective sensors S are sufficiently initialized by the initializing operation. If, however, the sensors S are not sufficiently initialized by the initializing operation (for example, the time during which thin-film transistors T corresponding to the sensors S are set in a conductive state is short) at the time of the execution of the above correction processing, transfer efficiency $\alpha$ ($0<\alpha<1$) may be used. In the fourth embodiment (see FIG. 8), for example, the relationship between $D_1\_i$ and $D_2\_i$ is expressed as $D_1\_i : D_2\_i = \alpha \times (ti-t_{xs}) : (1-\alpha) \times (ti-t_{xs}) + (t_{xe}-ti)$ within the range of $i_s \leq i \leq i_{ws}$ for an arbitrary column. In the same manner as described above, a correction coefficient Ei can be expressed as $Ei=(t_{xe}-t_{xs})/(t_{xe}-t_{xs}-\alpha \times (t_{ks}+T_k \times i/N-t_{xs}))$ within the range of $i_s \leq i \leq i_{ws}$. As described above, necessary information may be acquired, as needed, in accordance with specifications. For example, a coefficient may be multiplied in accordance with an environment for imaging.

Figure 9:
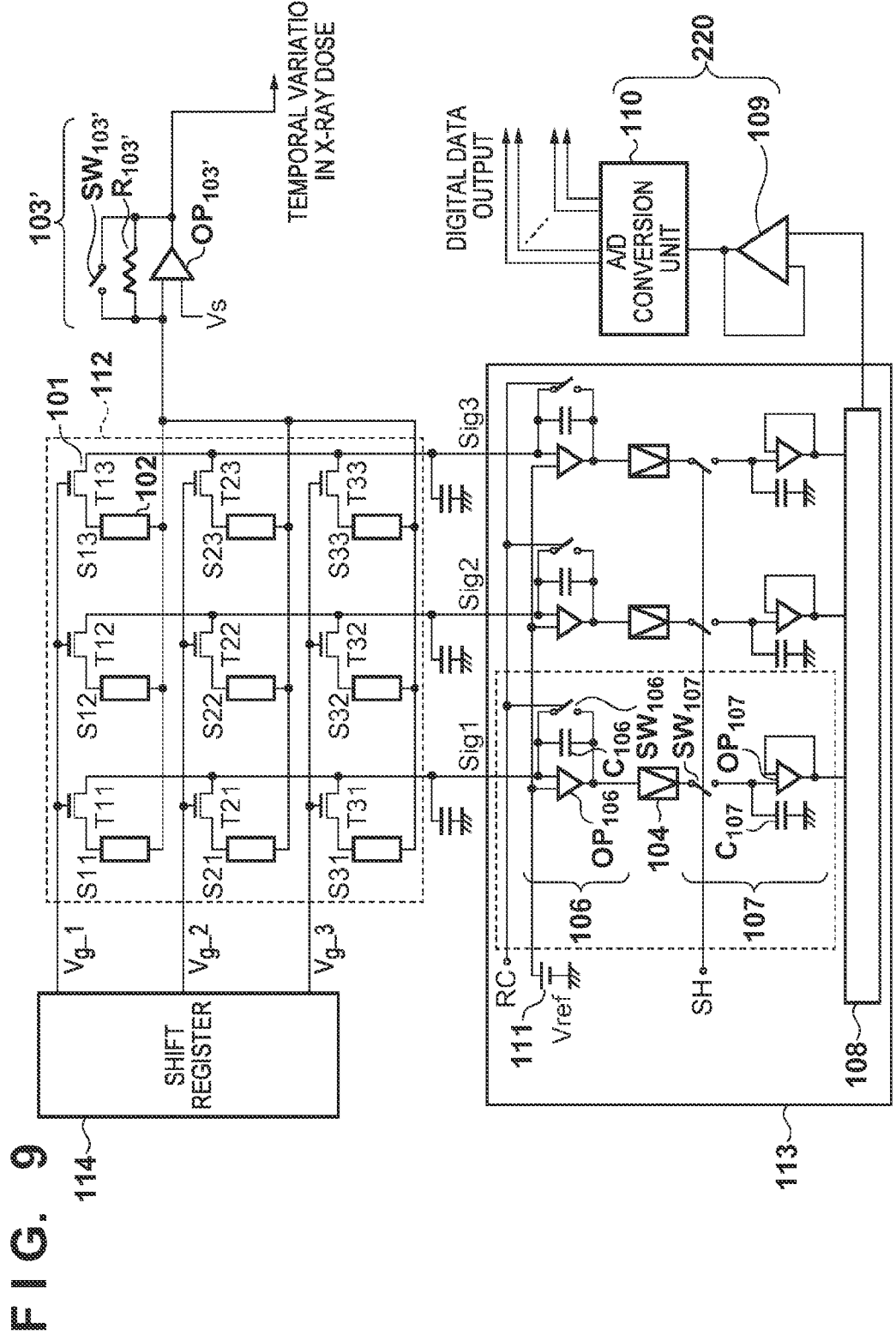
FIG. 9 is a circuit diagram for explaining another example of the circuit arrangement of a sensor array and its peripheral circuits.

Each embodiment described above has exemplified the arrangement using, for the detection unit 205, the sensors which convert radiation into electrical signals and detect the signals. However, this arrangement may be implemented by monitoring a current from a bias current source which applies a reference voltage Vs to each sensor S of a sensor array 112. As shown in FIG. 9, for example, it is possible to use a power supply unit 103' instead of the power supply 103 which applies the reference voltage Vs to each sensor S. As the power supply unit 103', for example, a current/voltage conversion circuit using an operational amplifier $OP_{103'}$, a feedback resistor $R_{103'}$, and a switch $SW_{103'}$ is used, and the power supply unit 103' detects radiation based on a change in the current amount of the reference voltage Vs. The switch $SW_{103'}$ may be set in a non-conductive state in the mode of detecting radiation, and may be set in a conductive state in the mode of performing readout operation. The power supply unit 103' converts the current amount of the reference voltage Vs generated upon generation of charges in each sensor by irradiated radiation into a voltage. It is possible to detect the irradiation of radiation based on this voltage by using a comparator. Although the imaging system of this embodiment may have the same arrangement as that shown in FIG. 1, the driving unit 204 may supply a control signal for the switch SW$_{103}$, to the power supply unit 103' having a function as the detection unit 205.

The operation of each embodiment described above may be implemented by causing a CPU to control the respective units such as the driving unit 204, a correction unit 207, and a calculation unit 208 in accordance with predetermined programs. For example, a processor belonging to a processing unit 206 may control the correction unit 207 and the calculation unit 208 to perform the above correction processing (second instruction) by causing the driving unit 204 to perform the operation based on the above flowchart (first instruction) in accordance with control programs. Control programs may be read out from a known recording medium such as a CD-ROM or may be obtained via a known transmission means such as a network.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-192291, filed Aug. 31, 2012, which is hereby incorporated by reference herein in its entirety.

What is claimed is:

1. A radiation imaging apparatus comprising:
a sensor array in which a plurality of sensors configured to output signals corresponding to irradiated radiation are arranged to form a plurality of rows and a plurality of columns;
a driving unit configured to drive the sensor array;
a detection unit configured to detect radiation; and
a processing unit configured to process signals from the sensor array,
wherein the driving unit is configured to drive the sensor array, so as to initialize the plurality of sensors for each row repeatedly at least until the detection unit detects irradiation of radiation, and so as to read out, from the plurality of sensors for each row sequentially, signals each of which corresponds to an amount of charges accumulated after final initialization of the corresponding sensor, and
wherein the processing unit is configured
to measure a waveform concerning an intensity of irradiated radiation,
to calculate a ratio between a radiation dose measured in a first term from the instant the irradiation is started to the instant the initialization is performed and a radiation dose measured in a second term from the instant the first term ends to the instant the irradiation ends, and
to correct a signal from the sensor on a row, of the plurality of sensors, which has been initialized during irradiation of radiation, so as to compensate for a degradation in the signal due to the initialization performed after the irradiation, based on the calculated ratio and the signal from the sensor on the row which has been initialized during the irradiation.

2. The apparatus according to claim 1, wherein when the detection unit detects the start of irradiation of radiation, the driving unit is configured to interrupt the initialization on a row, in the plurality of the sensors, corresponding to a timing of the detection.

3. The apparatus according to claim 1, wherein when the detection unit detects the start of irradiation of radiation, the detection unit is configured to start to read out signals from the plurality of sensors before initialization of the plurality of sensors is performed up to a last row.

4. The apparatus according to claim 1, wherein when the detection unit detects the start of irradiation of radiation, the detection unit is configured to start to read out signals from the plurality of sensors after initialization of the plurality of sensors up to a last row.

5. The apparatus according to claim 1, wherein the detection unit is configured to detect radiation based on a change in current in a bias current source configured to apply a reference potential to the plurality of sensors.

6. A radiation imaging system comprising:
a radiation imaging apparatus comprising a sensor array in which a plurality of sensors configured to output signals corresponding to irradiated radiation are arranged to form a plurality of rows and a plurality of columns, a driving unit configured to drive the sensor array, a detection unit configured to detect radiation, and a processing unit configured to process signals from the sensor array,
wherein the driving unit is configured to drive the sensor array, so as to initialize the plurality of sensors for each row repeatedly at least until the detection unit detects irradiation of radiation, and so as to read out, from the plurality of sensors for each row sequentially, signals each of which corresponds to an amount of charges accumulated after final initialization of the corresponding sensor, and
wherein the processing unit is configured
to measure a waveform concerning an intensity of irradiated radiation,
to calculate a ratio between a radiation dose measured in a first term from the instant the irradiation is started to the instant the initialization is performed and a radiation dose measured in a second term from the instant the first term ends to the instant the irradiation ends, and
to correct a signal from the sensor on a row, of the plurality of sensors, which has been initialized during irradiation of radiation, so as to compensate for a degradation in the signal due to the initialization performed after the irradiation, based on the calculated ratio and the signal from the sensor on the row which has been initialized during the irradiation; and
a radiation source configured to generate radiation.

7. A method for controlling a radiation imaging apparatus including a sensor array in which a plurality of sensors configured to output signals corresponding to irradiated radiation are arranged to form a plurality of rows and a plurality of columns, and a detection unit configured to detect radiation, the method comprising:
driving the sensor array, so as to initialize the plurality of sensors for each row repeatedly at least until the detection unit detects irradiation of radiation, and so as to read out, from the plurality of sensors for each row sequentially, signals each of which corresponds to an amount of charges accumulated after final initialization of the corresponding sensor;
measuring a waveform concerning an intensity of irradiated radiation;
calculating, based on the measurement result, a ratio between a radiation dose measured in a first term from the instant the irradiation is started to the instant the initialization is performed and a radiation dose measured in a second term from the instant the first term ends to the instant the irradiation ends; and correcting a signal from the sensor on a row, of the plurality of sensors, which has been initialized during irradiation of radiation, so as to compensate for a degradation in the signal due to the initialization performed after the irradiation, based on the calculated ratio and the signal from the sensor on the row which has been initialized during the irradiation.

8. A non-transitory computer-readable storage medium having stored thereon a computer program which, when run on a computer, causes the computer to perform the method as defined in claim 7.

* * * * *